(12) United States Patent
Schweng

(10) Patent No.: US 7,486,298 B2
(45) Date of Patent: Feb. 3, 2009

(54) SIZE OPTIMIZED PIXEL LINE TO PIXEL BLOCK CONVERSION ALGORITHM

(75) Inventor: Detlef Schweng, Weinstadt-Schnait (DE)

(73) Assignee: Digital Imaging Systems GmbH, Kircheim/Teck-Nabern (DE)

( * ) Notice: Subject to any disclaimer, the term of this patent is extended or adjusted under 35 U.S.C. 154(b) by 360 days.

(21) Appl. No.: 10/990,010

(22) Filed: Nov. 16, 2004

(65) Prior Publication Data

US 2006/0104543 A1    May 18, 2006

(30) Foreign Application Priority Data

Nov. 12, 2004   (EP)   .................................. 04392038

(51) Int. Cl.
*G09G 5/36* (2006.01)
*G09G 5/00* (2006.01)
*G06F 12/00* (2006.01)

(52) U.S. Cl. .......................... 345/545; 345/649; 345/564

(58) Field of Classification Search ................. 382/235, 382/233; 345/659, 349
See application file for complete search history.

(56) References Cited

U.S. PATENT DOCUMENTS

| 5,453,792 | A | | 9/1995 | Gifford et al. | 348/441 |
|---|---|---|---|---|---|
| 5,867,598 | A | * | 2/1999 | de Queiroz | 382/235 |
| 5,883,676 | A | | 3/1999 | Miyazaki et al. | 348/567 |
| 6,353,682 | B2 | * | 3/2002 | Klassen | 382/233 |
| 6,483,540 | B1 | | 11/2002 | Akasawa et al. | 348/239 |
| 6,496,222 | B1 | | 12/2002 | Roberts et al. | 348/231 |
| 6,584,526 | B1 | * | 6/2003 | Bogin et al. | 710/124 |
| 6,587,157 | B1 | | 7/2003 | Guyot et al. | 348/714 |
| 6,661,452 | B1 | | 12/2003 | Nishikawa | 348/222.1 |
| 6,819,334 | B1 | * | 11/2004 | Owada et al. | 345/659 |
| 6,906,751 | B1 | * | 6/2005 | Norita et al. | 348/349 |
| 2002/0109689 | A1 | * | 8/2002 | Champion et al. | 345/536 |
| 2005/0249435 | A1 | * | 11/2005 | Rai et al. | 382/296 |

FOREIGN PATENT DOCUMENTS

WO    WO97/04420    2/1997

\* cited by examiner

*Primary Examiner*—Kee M Tung
*Assistant Examiner*—Jacinta Crawford
(74) *Attorney, Agent, or Firm*—Saile Ackerman LLC; Stephen B. Ackerman

(57) ABSTRACT

A method to convert line-based pixel data from an imager, e.g. a video camera into block-based pixel data with a minimum of buffer memory size has been achieved. Key of the invention is that as soon pixel data are read-out of a buffer memory, pixel data of the next image are written to the same position of the buffer memory as the pixels, which have been just read-out have been located. While in prior art the buffer memory required a capacity to store two images is, using the method invented, only a capacity to store one image required. A method to convert line-based pixel data for an image application reading-out column-wise has been illustrated in detail. This general method can be used for a multitude of image transformations and image compression methods e.g. for compression of pixel data as JPEG, for mirroring, tilting, rotating etc. of line-based pixel data.

26 Claims, 4 Drawing Sheets

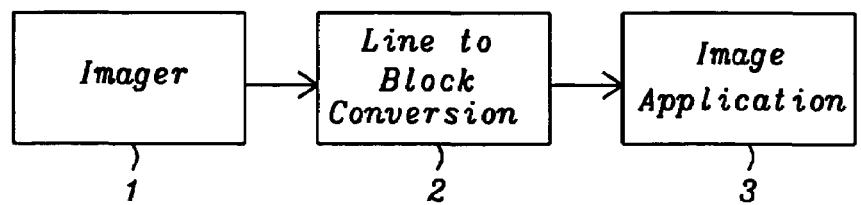
FIG. 1 – Prior Art
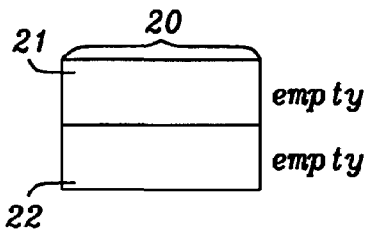
FIG. 2a – Prior Art
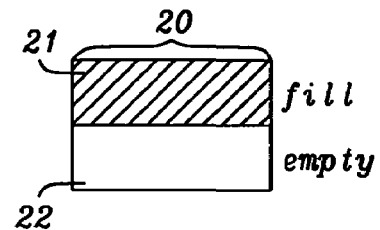
FIG. 2b – Prior Art
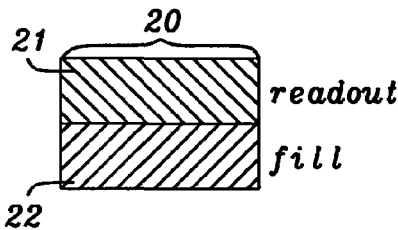
FIG. 2c – Prior Art
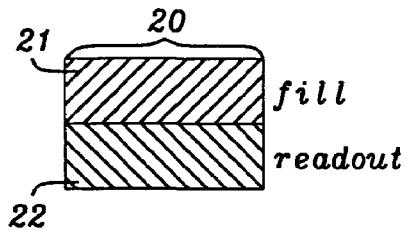
FIG. 2d – Prior Art

SIZE OPTIMIZED PIXEL LINE TO PIXEL BLOCK CONVERSION ALGORITHM

BACKGROUND OF THE INVENTION (1) Field of the Invention

The invention relates to processing of digital images, and more particularly to writing digital line based pixel data into a buffer memory comprising block based pixel data and relates to reading out these pixel data for further processing.

(2) Description of the Prior Art

Usually the output of imagers as e.g. digital cameras or scanners is pixel line oriented. Applications as e.g. mirroring of images or image compression require a block of pixel data. A buffer memory is commonly used to store the pixel data prior to further processing.

FIG. 1 shows a typical data flow of such a pixel line to pixel block conversion. An imager 1 as e.g. a digital camera provides line based pixel data, the next block 2 provides a conversion from line based pixel data to block based pixel data stored in a buffer memory to be read out for further processing as required by an following application 3, as e.g. mirroring of an image or image compression. Such image applications require a block of pixel data. A buffer memory is required to store said block of pixel data for further processing.

FIG. 2 a to FIG. 2 d prior art show how consecutively line based pixel data are filled into this buffer memory and read out by a related application. In FIG. 2a prior art the buffer memory 20, comprising an upper half 21 and a lower half 22 is empty. Both upper 21 and lower 22 halves have a capacity to store one complete image each. In FIG. 2b prior art the upper half 21 of the buffer memory 20 is filled line by line with pixel data from an imager until all pixels of a fist image are stored in the upper half 21 while the lower half 22 is still empty. In FIG. 2c prior art the pixels the image stored in the upper half 21 of the buffer memory 20 are read out while at the same time the lower half 22 is filled with pixel data of a second image, and in FIG. 2d prior art the upper half 21 is filled again with pixel data of a third image while the pixels of the second image stored in the lower half 22 are read out. This process of filling one half of the buffer memory 20, reading out the other half of the buffer memory 20 and vice versa is then continued until the end of the process. It is obvious that a buffer memory operated with such a method requires a size big enough to store all pixels of two images. Such a large buffer memory is expensive and requires high power consumption.

There are various patents known in the area of handling pixel data:

U.S. Pat. No. 6,496,222 (to Roberts et al.) describes a digital camera including a digital memory system having a control unit for checking for proper format initialization of a removable digital memory element and for performing format initialization of the memory element when necessary. Upon completion of an image conversion, the contents of a frame buffer are transferred to a compression processor.

U.S. Pat. No. 6,483,540 (to Akasawa et al.) discloses a digital camera comprising a pick-up image data memory for storing pick-up image data by a couple charged device (CCD), a title message table for storing a plurality of title message data to be superimposed over the pick-up image data and a plate table for storing a plurality of plate image data to be overwritten the title message data and a central processing unit (CPU). The CPU overwrites the title message data stored in the title message table on the plate image data stored in the plate table and superimposed the title message data with the plate image data over the pick-up image data stored in the pick-up data memory. Further, the CPU stored the superimposed pick-up image data in the pick-up image memory so that the superimposed image data can be reproduced following the original pick-up image data.

U.S. Pat. No. 6,661,452 (to Nishikawa) discloses a digital camera including an SDRAM. The camera data taken is first written on a camera data area formed in the SDRAM, and thereafter read out 8 lines a time. This 8-lines camera data is YUV-converted by a signal processing circuit. The resulting 8-lines YUV data is stored in a work area of the SDRAM. A JPEG CODEC reads the YUV data block by block out of the work area, and compresses it. The compressed data is written block by block over the camera data area. At this time, the compressed data is written over in a manner avoiding camera data uncompleted of compression. Such a process is repeated very 8 lines. If compressed data is obtained for all of the camera data stored within the camera data area, the compressed data is recorded at one time into a flash memory.

SUMMARY OF THE INVENTION

A principal object of the present invention is to achieve a method to convert line-based pixel data into block-based pixel data with a minimum of buffer memory space.

A further object of the present invention is to achieve a method to convert line-based pixel data into block-based pixel data with a minimum of buffer memory space in order to read-out pixel data column-wise.

In accordance with the principal object of this invention a method to convert line-based pixels to block-based pixels with a minimum of memory space required has been achieved. The method invented comprises step (1) to provide a device, which outputs a line-based stream of pixels, a buffer memory to buffer these pixels, having a capacity to store all pixels of one image, and a controller, controlling the write operation to the buffer memory and the read-out of the pixels to an image application, step (2) to write all pixels of first image in sequential order into buffer memory, and step (3) to read-out pixels from buffer memory as required by an image application and write pixels of the next image on the same positions the pixels have been read-out just before. The following steps are a check in step (4) if the last image of the line-based stream of pixels has not been written into buffer memory then the process flow goes to step 3; otherwise the process flow goes to step (5) to read-out the pixels of last image from buffer memory as required by an image application, and, finally, in step (6) go to end.

In accordance with the objects of this invention a method to convert line-based pixel data into block-based pixel data with a minimum of buffer memory space in order to read-out pixel data column-wise has been achieved. The method invented comprises step (1) to provide a device, which outputs a line-based stream of pixels, a memory to buffer these pixels, having a capacity to store all pixels of one image, and a controller, controlling the write operation to the buffer memory and the read-out of the pixels to an image application, step (2) to write all pixels of first image in sequential order into buffer memory, step (3) to define a "next_step_size" variable of pixel read-out, and step (4) to assign the value of this next_step_size variable to the variable "step_size" of pixel read-out. Furthermore the method invented comprises the next steps (5) to set the variable input_position_counter of input stream to zero, step (6) to set "read-out-pointer" variable to zero, step (7) to read-out pixel from buffer memory at location defined by "read-out-pointer∞variable, and step (8) to write pixel from input stream at location defined by "input_position_counter" variable into buffer memory at location defined by "read-out-pointer" variable. These steps are followed in step (9) by a check if the "input_position_counter" is set on the first pixel of the second line of the actual image. In case this check is negative then the process flow goes to step 11; else the process flow goes to the following step 10. In step 10 the actual value of the "read-out_pointer" variable is assigned to the "next_step_size" variable and in the following step (11) the "input_position_counter" variable is increased by 1. In step (12) is a check if the "input_position_counter" variable exceeds the total number of pixels of an image. In case this check is positive then the process flow goes back to step 4 else the process flow goes to step (13) in which the "read-out_pointer" variable is increased by the "step_size" variable. The last steps comprise in step 14 a check if the "read_out_pointer" variable" exceeds the total number of pixels of an image. In case this check is positive then the process flow goes to step 15 else the process flow goes to step 7. In step 15 the "read-out_pointer" variable is decreased by the total number of pixels of an image and increased by 1. In the final step 16 the process flow goes back to step 7.

BRIEF DESCRIPTION OF THE DRAWINGS

In the accompanying drawings forming a material part of this description, there is shown:

FIG. 1 shows a block diagram of a system comprising an imager, a buffer memory to buffer pixel data to convert line-based pixel data to block-based pixel data.

FIG. 2*a-d* prior art illustrates how a buffer memory requires a capacity to store two images.

DESCRIPTION OF THE PREFERRED EMBODIMENTS

Figure 3:
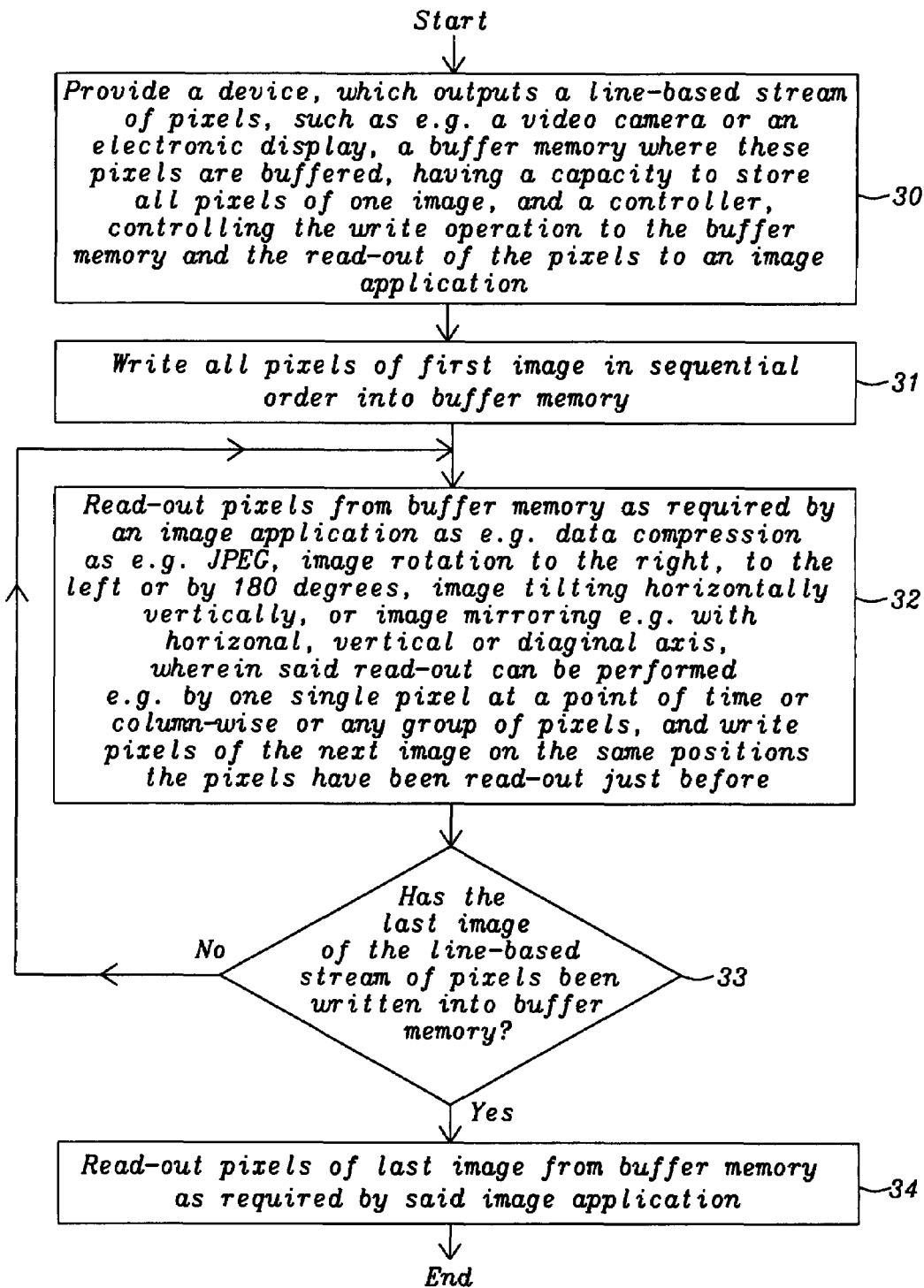
FIG. 3 shows a flow diagram of the method invented to convert line-based pixels to block-based pixels with a minimum of memory space

The preferred embodiments of the present invention disclose novel methods to perform the conversion of line based pixel data into block based pixel data with a minimum of buffer memory.

The invention can be applied to all streaming images as e.g images of video cameras and images of electronic displays such as LCD displays.

One key point of the method invented is that right after a single pixel or a group of pixels is read out from a buffer memory a single pixel or correspondingly a group of pixels of a next image is written into the same location of the buffer memory of the single pixel or of the group of pixels being read-out before. Therefore the size of the buffer memory can be reduced to half of the size of a prior art buffer memory. The buffer memory of the present invention requires a capacity to store one image only. A controller controls the locations of the pixels of the previous and the new image within the buffer memory.

The present invention can be used for a multitude of image applications as e.g. JPEG conversions or other image conversions and for any image transformations as e.g. flipping, rotating or mirroring of images.

In order to explain the method invented an example is described here. This example of a column-wise read-out of images illustrates one preferred embodiment of the invention. In order to avoid unnecessary complexity the handling of images having 6×4 pixels is described. It is obvious that larger images can be handled exactly the same way as described her. The method invented can be applied by any imaginable resolution. In this simple example video images having 6 columns and 4 rows are to be read-out column-wise (which leads to a mirrored image). A first image has to be stored in a buffer and has to be read out in a different order. The pixels of the first image are streamed into the buffer in the following order:

| 1  | 2  | 3  | 4  | 5  | 6  |
|----|----|----|----|----|----|
| 7  | 8  | 9  | 10 | 11 | 12 |
| 13 | 14 | 15 | 16 | 17 | 18 |
| 19 | 20 | 21 | 22 | 23 | 24 |

The numbers above are the locations of the pixels in the input stream, the order in the memory shows the locations in the matrix above.

In order to display the image of the example column-wise the pixels have to be read-out in a different order than they have been written into the buffer memory. This means the pixels have to read out in the following order from the memory (the following numbers signify the locations of the pixels in the input stream):

| 1, 7, 13, 19,      |
| 2, 8, 14, 20,      |
| 3, 9, 15, 21,      |
| 4, 10, 16, 22,     |
| 5, 11, 16, 23, and |
| 6, 12, 18, 24.     |

While the first image is read-out in the order shown above a pixel of the second image is written into the buffer memory right after a pixel is read-out and the pixel of the next image is written into the same location as the previous pixel has been read-out. Therefore the size of the buffer memory is optimized. The pixels of the second image are stored then according to the read-out sequence shown above in the following order:

| 1 | 5 | 9  | 13 | 17 | 21 |
|---|---|----|----|----|----|
| 2 | 6 | 10 | 14 | 18 | 22 |
| 3 | 7 | 11 | 15 | 19 | 23 |
| 4 | 8 | 12 | 16 | 20 | 24 |

After the first image is read out column-wise and the second image is stored as described above the second image is read-out using the same order as with the first image in order to read-out the second image as well:

| 1, 7, 13, 19,      |
| 2, 8, 14, 20,      |
| 3, 9, 15, 21,      |
| 4, 10, 16, 22,     |
| 5, 11, 16, 23, and |
| 6, 12, 18, 24.     |

Consequently the pixels of the third image are stored in the memory buffer in the following order:

| 1  | 17 | 10 | 3  | 19 | 20 |
| 5  | 21 | 14 | 7  | 23 | 16 |
| 9  | 2  | 18 | 11 | 4  | 20 |
| 13 | 6  | 22 | 15 | 8  | 24 |

The process is continued as described above, the pixels of the following image are always stored in the locations of the pixels of the previous image, which have just being read-out.

The method invented has to ensure that pixels are being read-out of the buffer memory in the order desired. The flow-chart of FIG. 3 illustrates generally how the method invented works.

FIG. 3 shows a flowchart showing the general outline of the method invented. Step 30 shows the provision of a device, generating a line-based stream of pixels, a buffer memory where these pixels are buffered, having a capacity to store all pixels of one image, and a controller, controlling the write operation into the buffer memory and the read-out of the pixels from the buffer memory to an image application.

Such a device, generating a line-based stream of pixels, could be any imager, e.g. a video camera. In step 31 all pixels of a first image of the line-based stream of pixels are written into the buffer memory. In step 32 the pixels of an image stored in the buffer memory are being read-out as required by an image application and as soon as a pixel has been read-out a pixel of the next image in the line-based pixel stream is written into the same position as the pixel, which has been just been read-out. This implies that the memory location of the next pixel/block for any consecutive image is calculated as required by the image transformation used the image application, reading the pixel/block and writing the next pixel/block into this memory location. It can be a process by writing and reading single pixels or it can be by writing and reading of sequential blocks of pixels, which are being read-out and written right afterwards using the same locations. In step 33 is a check if the last image of the line-based pixel stream has been written into the buffer memory.

In case this check is negative, this means the last image has not been yet written into the buffer memory, the process flow goes back to step 32 and the current image is read-out and the following image is written into the buffer memory.

In case the check of step 33 is positive, this means the last image has been written into the buffer memory, the process flow goes back to step 34 wherein the last image is read-out as required by an image application and then the process is finished.

The method invented requires only half the size of a buffer memory compared to prior art, In prior art a buffer memory requires a capacity of the buffer memory to store two images, using the method invented the buffer memory requires a capacity to store one image only.

It has to be understood that a multitude of different image applications can use the method invented. This could be image applications as e.g. flipping the images horizontally or vertically, rotating to left, right, or by 180. degree., mirroring the image with a horizontal, vertical or diagonal axis, or also do an reordering for compressions as e.g. for a JPEG compression. The controller ensures that the pixels are written and subsequently read-out in the order required by an image application.

Figure 4A:
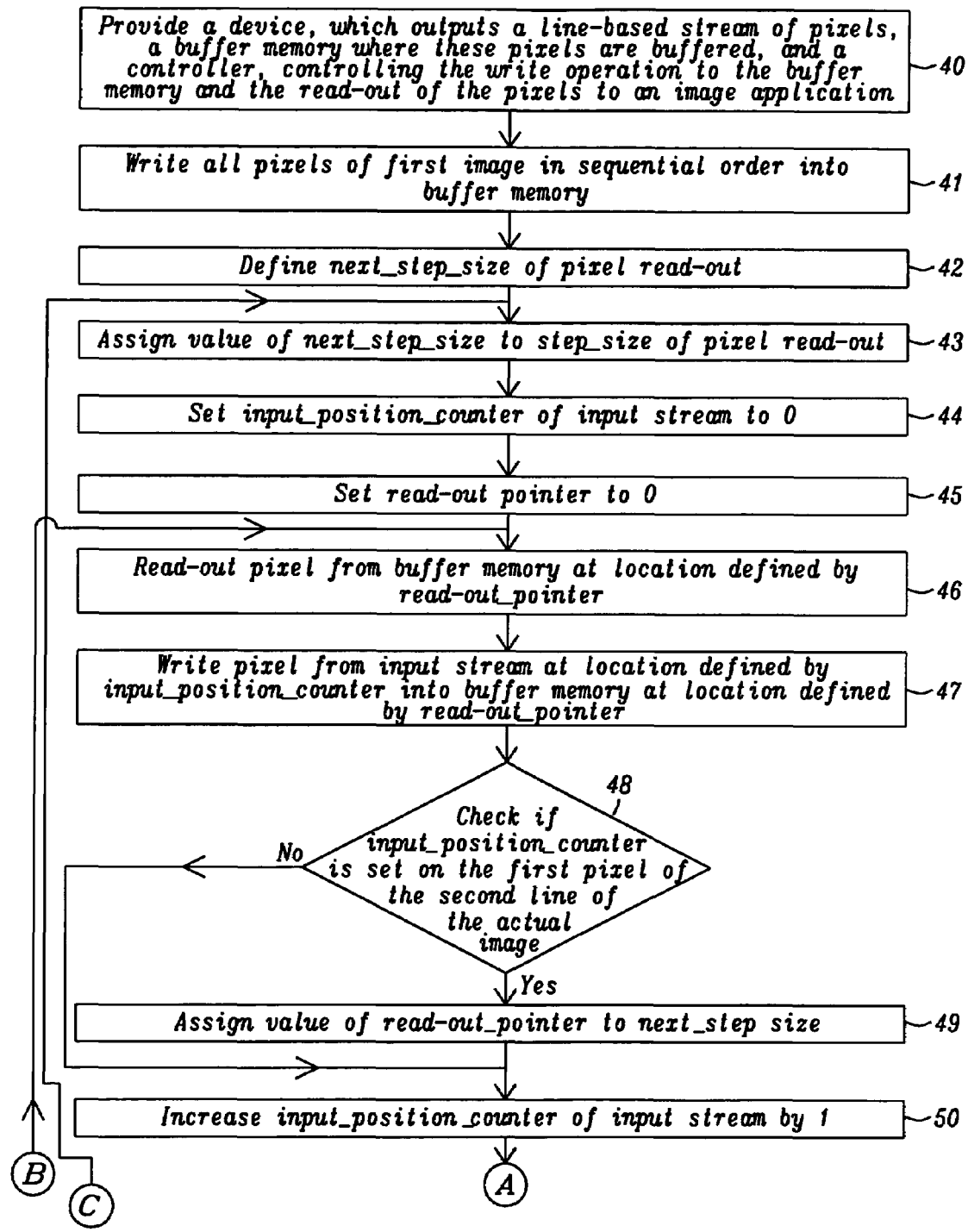
FIG. 4*a* shows a flowchart of the first 11 steps of a method invented to convert line-based pixels to block-based pixels in order to perform a column-wise readout with a minimum of memory space.
Figure 4B:
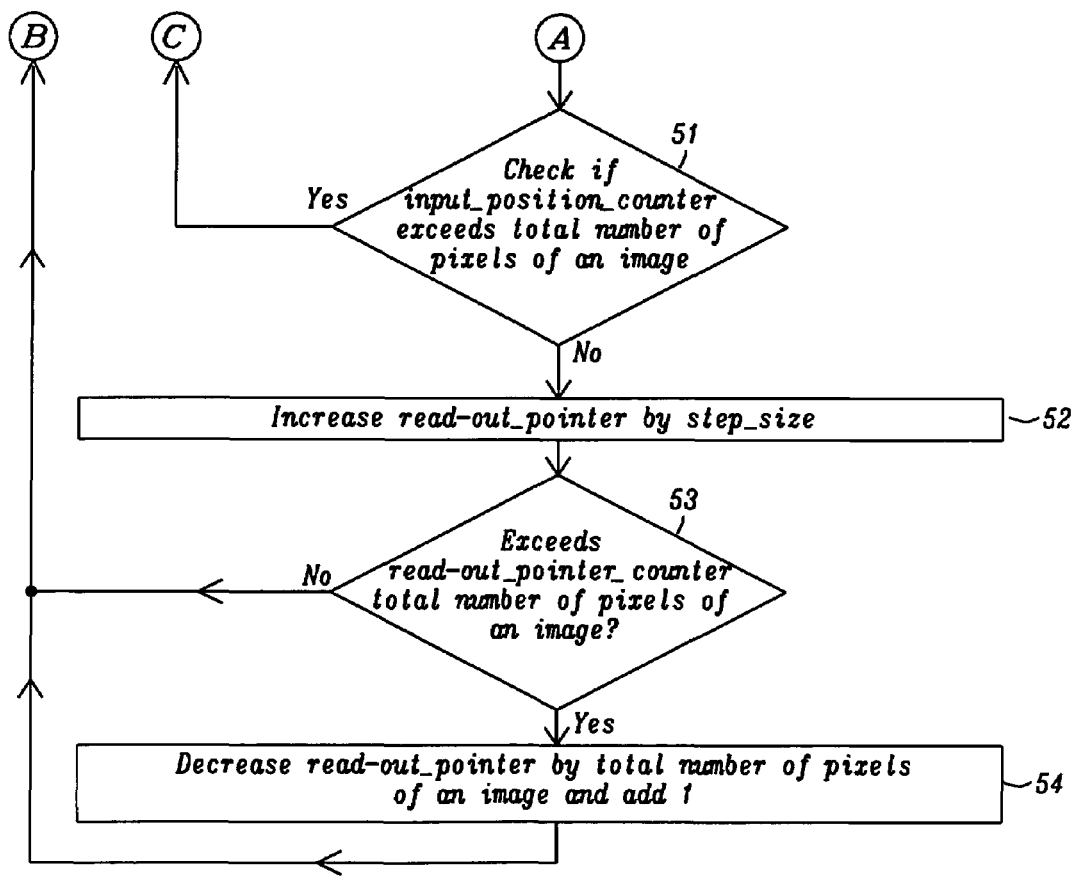
FIG. 4*b* shows a flowchart of the last four steps of a method invented to convert line-based pixels to block-based pixels in order to perform a column-wise readout with a minimum of memory space.

FIG. 4a and FIG. 4b show in more detail how the method invented can be applied using the example of a column-wise read-out of pixels as it has been described using the 6×4 pixels example described above. FIG. 4a shows the first 11 steps from step 40 to step 50 FIG. 4b shows the last four steps from step 51 to step 54.

It is important to understand that the matrix positions and the positions of the input stream start always with position zero. The 24 pixels of the example above are located in the buffer memory on the following positions starting with zero:

| 0  | 1  | 2  | 3  | 4  | 5  |
| 6  | 7  | 8  | 9  | 10 | 11 |
| 12 | 13 | 14 | 15 | 16 | 17 |
| 18 | 19 | 20 | 21 | 22 | 23 |

Step 40 illustrates the provision of a device, which outputs a line-based stream of pixels, a buffer memory where these pixels are buffered, and a controller, controlling the write operation to the buffer memory and the read-out of the pixels to an image In step 41 all pixels of a first image are written from the input stream from an imager into the buffer memory. In step 42 a "next_step_size" variable is defined. This "next_step_size" variable defines an initial step size of the steps of positions used in the read-out from the memory buffer. In the example of a mirrored image described above this first_step_size value is defined by the position of the first pixel in the second row of pixels, the $7^{th}$ pixel, which is in position 6 (positions are starting with zero). Therefore this "next_step_size" value is defined by 6 in the example described here and above. In step 43 this "next_step_size" value is assigned to the variable "step_size". This "step_size" variable describe the actual steps within the buffer memory to read-out the pixel required by the image application. In step 44 the variable "input_position_counter" is set to zero. This "input_position_counter" variable defines the position of the pixel to be written from the input stream of the imager. The first pixel of the input stream has the position zero. In step 45 the variable "read-out-pointer" is set to zero. This variable defines the position of the pixel in the memory buffer to be read out. In our example the first pixel, which is in position zero, is being read out first.

In step 46 the pixel, located on the position defined by the "read-out-pointer" variable, is read-out from the memory buffer. In step 47 a pixel of the next image in the input stream from an imager on a location defined by the variable "input_position_counter" is written into the buffer memory on the same location of the buffer memory as in the previous step 46 a pixel has been read-out. It is the position defined by the "read-out-pointer" variable. This is a key point of the invention. Right after a pixel has been read-out from a location of the buffer memory, a pixel of the next image is written on the same location. In step 48 is a check if the "input_position_counter" variable is set on the first pixel of the second line of the actual image, this means the image which is currently read into the memory buffer from the input stream. In case the "input_position_counter" variable is set on said first pixel of the second line-then in step 49 the actual value of the "read-out_pointer" variable is assigned to the "next_step_size" variable and the process flow goes to step 50. In case the "input_position_counter" variable is not set on said first pixel of the second line then the process flow goes directly to step 50.

In step 50 the variable "input_position_counter" is increased by 1 in order to prepare the write-operation of the next pixel from the input stream.

In step 51 is a check if all pixels of an image have already been written into the buffer memory.

In case the check of step 51 is positive and all pixels of an image have been written into the buffer memory the process flow is going back to step 43 in which the variable "step_size" is updated.

In case the check of step 51 is negative and not all pixels of an image have been written into the buffer memory the process flow goes to step 52. In step 52 the variable "read-out_pointer" is increased by the value of the variable "step_size. In the following step 53 is a check if the "read-out-position_counter" variable exceeds the total number of pixels of an image.

In case the check of step 53 is negative and the "read-out-position_counter" variable does not exceed the total number of pixels of an image the process flow goes back to step 46 to read out the next pixel from the buffer memory at the position defined by the "read-out-pointer" variable.

In case the check of step 53 is positive and the "read-out-pointer" variable exceeds the total number of pixels of an image, the "read-out-pointer" variable is reduced in step 54 by the total number of pixels of an image and then increased by 1. The process flow is then going back to step 46.

In order to avoid unnecessary complexity the process flow described here does not include the situation of the last image of the input stream. This situation has been already covered in the flowchart of FIG. 3. It is obvious that in this situation the pixels of the last image are being read-out from the buffer memory without additional pixels being written from the input stream.

The method illustrated in FIG. 4 describes a column-wise read-out of an image as described in a simple 6×4 pixel example above. It has to be understood that this is only one example amongst a multitude of different image applications, which can be performed by only small modifications of the method described in FIG. 4. These small modifications include generally a different step size, which could be sometimes also negative, and a modified read-out pointer. For some image transformations the read-out pointer is not "decreased by total number of pixels followed by adding 1" as described in step 54 of FIG. 4 but instead of adding 1 another constant "N" has to be added.

Key of the invention is that only one buffer memory having the size to store one image only can be used to perform a multitude of applications. These applications include flipping an image vertically and horizontally, rotating an image left, right, or by 180°, or mirroring the image using a horizontal, vertical, or diagonal axis or it could be a reordering of pixels for compression, as, e.g. JPEG compression. All these applications can be supported by only very small modifications of the method described in FIG. 4. These modifications could be just storing the position of the first pixel and the second pixel of the next image to get the starting point and the step-size for the pointer of the next image, While the invention has been particularly shown and described with reference to the preferred embodiments thereof, it will be understood by those skilled in the art that various changes in form and details may be made without departing from the spirit and scope of the invention.

What is claimed is:

1. A method to convert line-based pixels to block-based pixels with a minimum of memory space required comprising:

step1: providing a device, which outputs a line-based stream of pixels, a buffer memory to buffer these pixels, having a capacity to store all pixels of only one image, and a controller, controlling a write operation to the buffer memory and a read-out of the pixels to an image application;

step2: writing all pixels of a first image in sequential order into the buffer memory;

step3: if more images are to be converted to block-based pixels, go to step 4, else go to step 7;

step4: calculating a memory location of a first part of pixels of a consecutive image as required by an image transformation used in an image application, reading-out the first part of pixels of said consecutive image from buffer memory and writing a first part of pixels of a next image into this memory location; then step5: calculating a memory location of a next part of pixels of the consecutive image as required by the image transformation used in the image application, reading-out the next part of pixels of said consecutive image from buffer memory and writing a next part of pixels of the next image into this memory location; then step6: if last part of pixels of an image has been read-out from buffer memory, go to step3, else go to step5;

step7: reading-out pixels of a last image from the buffer memory as required by the image application; and step8: go to end.

2. The method of claim 1 wherein said image application is a data compression.

3. The method of claim 2 wherein said data compression is a JPEG-compression.

4. The method of claim 1 wherein said image application is a rotation of the image to the right.

5. The method of claim 1 wherein said image application is a rotation of the image to the left.

6. The method of claim 1 wherein said image application is a rotation by 180 degrees.

7. The method of claim 1 wherein said image application tilts the image horizontally.

8. The method of claim 1 wherein said image application tilts the image vertically.

9. The method of claim 1 wherein said image application reads the image column-wise from the buffer memory.

10. The method of claim 1 wherein said image application mirrors the image with a horizontal axis.

11. The method of claim 1 wherein said image application mirrors the image with a vertical axis.

12. The method of claim 1 wherein said image application mirrors the image with a diagonal axis.

13. The method of claim 1 wherein said device, which outputs a line-based stream of pixels, is a video camera.

14. The method of claim 1 wherein said device, which outputs a line-based stream of pixels, is an electronic display.

15. The method of claim 14 wherein said electronic display is an LCD display.

16. The method of claim 1 wherein a single pixel is read-out from buffer memory at one point of time as required by an image application and a single pixel of the next image is written on the same position the single pixel has been read-out just before and wherein this process is continued until all single pixels of an image have been written into the buffer memory and read-out one after the other.

17. The method of claim 1 wherein a group of pixels is read-out from buffer memory at one point of time as required by an image application and another group of pixels of the next image is written on the same position the group of pixels has been read-out just before and wherein this process is continued until all groups of pixels of an image have been written into the buffer memory and read-out one after the other.

18. The method of claim 1 wherein said image transformation comprises flipping, rotating, or mirroring of images.

19. A method to convert line-based pixels to block-based pixels to perform a column-wise readout with a minimum of memory space required is comprising:
- step1: providing a device, which outputs a line-based stream of pixels, a buffer memory where these pixels are buffered, having a capacity to store all pixels of one image, and a controller, controlling a write operation to the buffer memory and a read-out of the pixels to an image application circuitry;
- step2: writing all pixels of first image in sequential order into buffer memory;
- step3: defining next_step_size of pixel read-out;
- step4: assigning value of next_step_size to step_size of pixel read-out;
- step5: setting input_position_counter of input stream to zero;
- step6: setting read-out_pointer of input stream to zero;
- step7: reading-out pixel from buffer memory at location defined by read-out_pointer;
- step8: writing pixel from input stream at location defined by input_position_counter into buffer memory at location defined by read-out-pointer;
- step9: if input_position_counter is set on a first pixel of the second line of the actual image then go to step 10 else go to step 11;
- step10: assigning value of read-out_pointer to next_step_size;
- step11: increasing input_position_counter of input stream by 1;
- step12: if input_position_counter exceeds total number of pixels of an image then go to step 4 else go to step 13;
- step13: increasing read-out_pointer by step_size;
- step14: if read out_pointer_exceeds total number of pixels of an image then go to step 15 else go to step 7;
- step15: decreasing read-out_pointer by total number of pixels of an image and add 1; and
- step16: go to step 7.

20. The method of claim 19 wherein said device, which outputs a line-based stream of pixels is a video camera.

21. The method of claim 19 wherein said device, which outputs a line-based stream of pixels, is an electronic display.

22. The method of claim 21 wherein said electronic display is an LCD display.

23. A method to convert line-based pixels to block-based pixels to perform a column-wise readout with a minimum of memory space required is comprising:
- step1: providing a device, which outputs a line-based stream of pixels, a buffer memory where these pixels are buffered, having a capacity to store all pixels of one image, and a controller, controlling a write operation to the buffer memory and a read-out of the pixels to an image application circuitry;
- step2: writing all pixels of first image in sequential order into buffer memory;
- step3: defining next_step_size of pixel read-out;
- step4: assigning value of next_step_size to step_size of pixel read-out;
- step5: setting input_position_counter of input stream to zero;
- step6: setting read-out_pointer of input stream to zero;
- step7: reading-out a group of pixels from buffer memory as required by an image application starting at location defined by read-out _pointer;
- step8: writing a group of pixels from input stream at location defined by input_position_counter into buffer memory at location defined by read-out-pointer;
- step9: if input_position_counter is set on a first pixel of a second line of the actual image then go to step 10 else go to step 11;
- step10: assigning value of read-out_pointer to next_step_size;
- step11: increasing input_position_counter of input stream by next_step_size;
- step12: if input_position_counter exceeds total number of pixels of an image then go to step 4 else go to step 13;
- step13: increasing read-out_pointer by step_size;
- step14: if read_out_pointer exceeds total number of pixels of an image then go to step 15 else go to step 7;
- step15: decreasing read-out_pointer by total number of pixels of an image and add 1; and
- step16: go to step 7.

24. The method of claim 23 wherein said device, which outputs a line-based stream of pixels is a video camera.

25. The method of claim 23 wherein said device, which outputs a line-based stream of pixels, is an electronic display.

26. The method of claim 25 wherein said electronic display is an LCD display.

* * * * *